Figure 1:
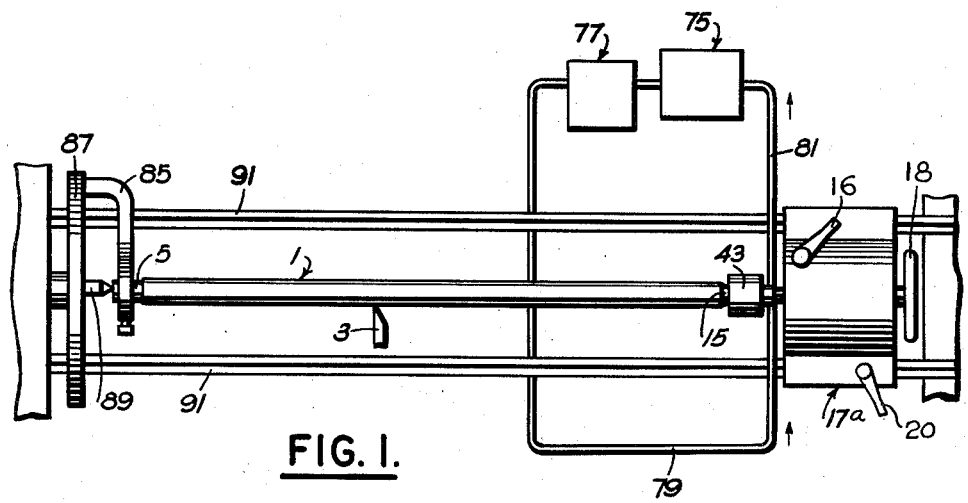

Sept. 16, 1958  A. J. GRANDY ET AL  2,851,916
VIBRATION REDUCTION IN MACHINING THIN-WALLED ELONGATED TUBES
Filed May 11, 1956

INVENTORS
ANDREW J. GRANDY
ALBERT M. STOTT
BY
W. E. Thibodeau, A. W. Dew
and H. J. Forman
ATTORNEYS:

United States Patent Office 2,851,916
Patented Sept. 16, 1958

2,851,916

VIBRATION REDUCTION IN MACHINING THIN-WALLED ELONGATED TUBES

Andrew J. Grandy, North Hills, and Albert M. Stott, Aldan, Pa.

Application May 11, 1956, Serial No. 589,357

1 Claim. (Cl. 82—43)

(Granted under Title 35, U. S. Code (1952), sec. 266)

The invention described herein may be manufactured and used by or for the Government for governmental purposes without payment of any royalty thereon.

The present application is a continuation-in-part of the prior application S. N. 402,421, filed January 5, 1954, for "Method and Apparatus for Working Thin-Walled Tubes."

This invention relates to the removal of metal from thin-walled elongated tubes and has for an object to permit greater precision in the work by greater precaution to reduce vibration or chatter during machining. Another object is to enhance the speed of machining such objects. A further object is to obtain these results with longer work at high speeds in tubes adapted to withstand higher pressure, and in tubes adapted to withstand a cut for the full length of the tube.

The provision of a hydraulic mandrel to reduce vibration or chatter in the work for the purpose of obtaining greater precision in the machining of the work has been suggested for work having a ratio of length to diameter of less than 2 where less than the full length of the work is to be machined. However, this suggestion has not been found satisfactory for longer work where substantially full length cuts are to be removed from a surface of a thin-walled tube, because chatter developed in spite of the hydraulic mandrel and resulted in non-uniformity of cut and a product not within the limits of the desired tolerance.

According to this invention, investigation and study has discovered why the hydraulic mandrel is inadequate and how the weakness of that prior suggestion may be overcome. One prior suggestion for use of a hydraulic mandrel or arbor to reduce chatter and enable a more nearly uniform product to be obtained in a thin-walled tube is shown in the patent to Pioch et al., 2,334,954, dated November 23, 1943. This prior suggestion was found unsuitable for careful machining of full length cuts upon longer tubes because chatter developed to the detriment of a satisfactory product. Objectionable chatter developed after starting to machine longer tubes and the hydraulic mandrel, though satisfactory to start with, seemed to lose its efficacy. Investigation and study discovered the reason to be in the development of heat in the longer tube which caused an increase in length of the work and an increase of compressive stress axially of the work, which increase in stress affected the natural period of vibration of the tube and hydraulic mandrel which they would otherwise have possessed. The Pioch et al. proposal made possible a change in longitudinal pressure on the work by adjustment of the nut 19 and its pressure upon the U washer 18. In the Pioch patent to accomplish this it was necessary to stop rotation of the work. In doing so, the work passed through speeds where chatter was more pronounced than at its intended operating speed and such vibration resulted in non-uniformity of cut to the detriment of the work. Longitudinal adjustment of the tail stock was not effective in controlling the axial pressure on the work because, to do so, a simultaneous change in length of the shaft 17 of Pioch et al. would have been required. After discovering the cause of vibration in a long tube mounted according to the Pioch et al. proposal, the remedy was found to be less difficult.

Specifically, the present invention provides a construction in which a simple adjustment of the tail stock suffices to change the axial pressure on the work while cutting and without having to stop the work or vary its rotational speed. The liquid for the hydraulic mandrel is given much more of a cooling function than was the case with the aforementioned Pioch et al. construction, by having the inside of the work substantially free of obstructions to rapid circulation of such liquid in contact with the work surface opposite that on which the cutting takes place.

Referring to the drawing, Fig. 1 is a top plane view of a portion of a lathe in which is mounted a thin-walled elongated tube.

Figure 2:
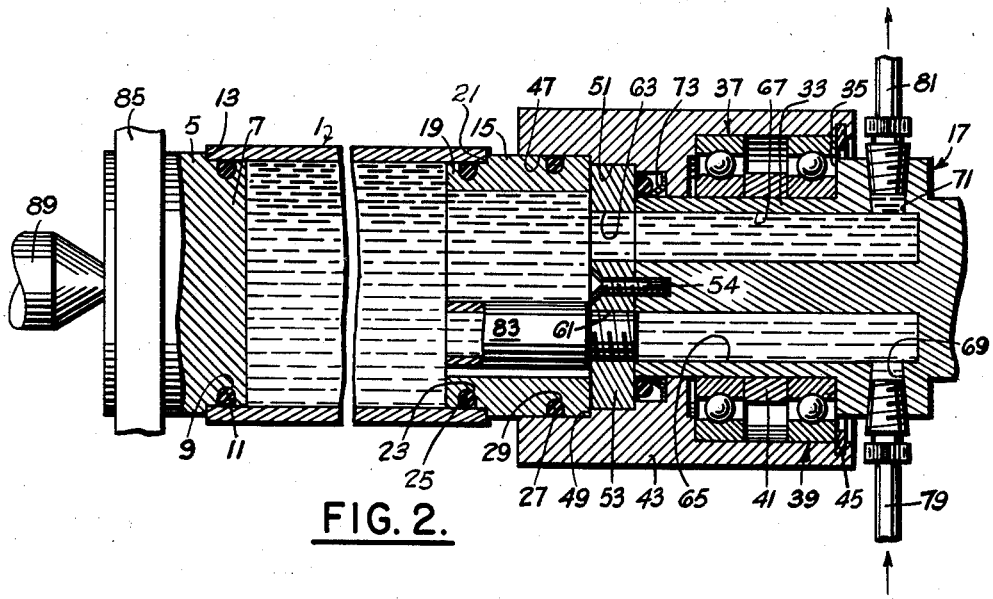

Fig. 2 is a longitudinal section through the work and the work support at the right or tail stock end of the work.

An elongated thin-walled tube 1 is shown in Figs. 1 and 2 as being mounted in a lathe for cooperation with a longitudinally movable cutting tool 3. An adapter or cylindrical portion 5 fits snugly within the left or headstock end of the tube 1. This adapter 5 has a reduced portion 7 of a size that snugly fits telescopically within the work 1 and is provided with a circumferential groove 9 in which a resilient gasket or O ring type packing 11 is mounted. A shoulder or abutment 13 is formed on the adapter and against which the tube 1 is pressed. Assembled in this way, the gasket 11 engages the inner wall of the tube to form a pressure seal between the adapter and tube.

The opposite or right or tailstock end of the tube is supported and closed by a tubular adapter or second cylindrical portion 15 which is also of the size to snugly fit within the tube 1. An adapter 15 supports the right hand of the tube 1 through the aid of the tail stock 17a, the supporting center of which is modified and indicated by the number 17. This tail stock is provided with the usual clamping handle 16 by means of which the supporting center is locked or clamped in adjusted position. There is also provided a wheel or handle 18 or longitudinal adjustment of the supporting center 17. Likewise, the usual clamping adjustment 20 for the tail stock is provided to prevent the tail stock 17a being moved along the guide rails of the bed when such is not desired. As shown in Fig. 2, the adapter 15 has a reduced portion 19 and a shoulder or abutment 21 which is adapted to press against the end of the tube 1. A circumferential groove 23 in the surface of the reduced portion forms a seat in which is disposed a resilient gasket of the O ring type 25. When assembled with the end of the tube 1 abutting the shoulder 21 on the adapter, the sealing ring forms a good seal between the adapter and inner wall of the tube. Sealing the other end of the adapter 15 when assembled with modified tail stock work supporting center 17, is another resilient gasket or packing ring 27 mounted in the circumferential groove 29 on the adjacent end of the adapter 15.

A section 33 of the work supporting center 17 terminates in the shoulder 35 and supports a pair of ball bearing assemblies 37 and 39 which are held in spaced relation by a collar 41. Enveloping and supported by the bearing assemblies is a housing 43 which is maintained in relationship with the bearings by a snap ring 45 at the end thereof. The end of the housing adjacent the workpiece is provided with a bore 47 of adequate size to accommodate the end of the adapter 15. A shoulder 49 on the housing transmits axial pressure to the adapter 15 and terminates the adapter receiving bore 47 and defines a smaller diameter bore 51. The smaller bore 51 accommodates a washer 53 rigidly attached to the work supporting center 17 by any suitable means such as the machine screw 54. The washer 53 maintains the housing 43 on the work supporting center 17 in assembled relationship. Openings 61 and 63 in the washer extend through it to allow circulation of the hydraulic fluid or cooling medium. Aligned with the openings 61 and 63 in the washer are longitudinally extending bores 65 and 67 in the work supporting center 17 with which the inward and outlet port 69 and 71 respectively, communicate. Sufficient clearance is provided between the washer 53 and the housing 43 and the adapter 15 assembly to permit relative rotational movement therebetween. A packing seal 73 provides a resilient pressure barrier between the center 17 and the rotatable housing 43.

A fluid supply system shown in Fig. 1 furnishes the workpiece with liquid as oil, water, or any other liquid coolant found satisfactory, such hydraulic fluid being under pressure. This system includes reservoir 75, a pressure regulated feed pump 77, a delivery line 79, and a return line 81. The reservoir maintains a supply of liquid to the pump which in turn forces the liquid under pressure through the delivery line to the inlet port 69 of the stationary work supporting center 17. From the inlet port the liquid passes through the longitudinal bore 65 into the aligned opening 61 in the washer 53 and then directly into the interior of the tubular workpiece 1. It may sometimes be found desirable to carry the liquid inwardly of the tube end to obtain a better circulation within the tube. Accordingly, the inlet opening 61 on the washer 53 is threaded to accommodate a threaded duct 83. The length of this duct or the distance which the duct may be extended into the tube is a matter of expediency to be determined by the amount of liquid circulation desired. Where considerable heat is to be removed from the workpiece better circulation is needed.

The liquid is returned to the reservoir by passing through the discharge openings 63 in the washer, into the longitudinal bore 67, through the outlet port 71 of the center 17, and into the return line 81, which delivers it to the reservoir for recirculation through the system in the prescribed manner. The liquid should be regulated by the pump to maintain at least atmospheric pressure against the inner wall of the tube of the workpiece whether it is circulated or not. The supply of liquid at substantially constant pressure is usually essential to the present system, circulation of the liquid being used to an advantage for removal of heat from the workpiece. The present system is a satisfactory method of obtaining constant pressure within the workpiece. It will automatically compensate for leakage and expansion of liquid due to heat, etc.

The workpiece 1 is positioned for machining operation in the following manner. The adapters 7 and 15 are placed in the ends of the tube in sealing engagement therewith. A dog clamp 85 is affixed to the head stock end of the adapter 7 and placed in driving engagement with the head stock face plate 87. This end of the tubular workpiece is concentrically supported by means of a rotatable center 89 of the head stock, which engages the center of the adapter. At the other end, the adapter 15 is placed in sealing engagement with bore 47 of the housing 43. This is accomplished by moving the work supporting center 17 and the tail stock 17a along the guide rails 91 toward the tube until the engagement of the parts is complete. The pressure liquid is then supplied to the workpiece as described above. Practice and skill determine the amount of pressure longitudinally of the work adapted to be supplied to the work by the tail stock. For an alloy steel tube about 4 inches in diameter and 10 feet long a rotational speed of between about 150 to 300 revolutions per minute has been found desirable. However, with nonferrous material a rotational speed of as high of as 500 to 1,000 R. P. M. is desirable in obtaining a better finish. The workpieces for which the present invention is designed include those tubes which are required to maintain unusually high pressures from cartridge actuated devices and these tubes are used in catapults, thrusters and the like on airplanes, and in thin wall gun tubes as used in recoilless rifles. The requirement to obtain the best longitudinal pressure on the work is acquired with skill and experience by sight, touch and hearing. After the work has been heated by the cutting tool it is often necessary to adjust some of the longitudinal pressure because the work in becoming heated has expanded, increasing the axial pressure on the tube 1. Of course, if the hydraulic mandrel or cooling liquid had been at a temperature considerably below that of the work, the operator may need to adjust the pressure on the work longitudinally thereof. An important feature of the present invention is the ability of an operator to vary the longitudinal pressure on the work during rotation and without having to stop the work or to change its rotational speed. A liquid pressure of about 10 to 30 pounds per sq. inch has been found desirable. The greater length of workpieces encountered with the present invention and the fact that the cutters are required to operate over a substantially full length of the workpiece, cause the heat generated to be much greater than where only a short workpiece is encountered and not even its full length is traversed by a cutter or grinder. A feature of the present invention is the provision of a live center, i. e., one in which the tail supporting center rotates with the work from a stationary center 17. Such a live center enables satisfactory packing rings to be used without undue leakage and pressurizing of the cooling liquid.

The use of a liquid reinforcement is not confined to the liquid being within the work. Likewise, the need for the present invention in requiring liquid reinforcement and change in longitudinal pressure on the work, is not confined to the embodiment illustrated in which the cut is on the outside of the work.

Among the advantages of the present invention may be mentioned the greater freedom from chatter and the greater uniformity in removal of metal with more precision in size and finish of the work. The greater speed of operation permissible enables the work to be expedited. These foregoing advantages better adapt the present invention for use with longer work and at higher speeds where the work must be unweakened by any heating effect in the removal of metal and also where the work must be adapted for continuous long cuts. At the conclusion of the cutting operation, the liquid will be easy to drain out of the substantially straight long tubular workpiece.

We claim:

In combination, a support, a headstock and a tailstock mounted on said support in spaced relationship for supporting a workpiece therebetween, said headstock having a cylindrical portion provided with an end facing said tailstock, said cylindrical portion having an annular recess providing a reduced cylindrical portion for telescopically receiving the end of a tubular workpiece and providing a shoulder for abutting said end of a workpiece, said tailstock including a stationary bearing and a sleeve rotatably mounted on said bearing, said sleeve including a second cylindrical portion having an annular recess similar to that in first mentioned cylindrical portion for mounting the other end of a tubular workpiece from that supported by the first mentioned cylindrical portion, fluid conduits connected to said bearing for the circulation of liquid thereto and passages from said conduits to the interior of said sleeve and second mentioned cylindrical portion for conducting the liquid to the interior of said workpiece whereby said workpiece is entirely supported by said headstock and tailstock and reinforced by liquid under pressure.

References Cited in the file of this patent

UNITED STATES PATENTS

| | | |
|---|---|---|
| 1,313,205 | Quackenbush | Aug. 12, 1919 |
| 1,447,821 | Schneider | Mar. 6, 1923 |
| 1,578,751 | Nethlin | Mar. 30, 1926 |
| 1,823,642 | Brown | Sept. 15, 1931 |
| 2,318,838 | Conradson | May 11, 1943 |
| 2,334,954 | Pioch | Nov. 23, 1943 |
| 2,402,979 | Barto | July 2, 1946 |
| 2,494,196 | Pesqueira | Jan. 10, 1950 |